United States Patent [19]

Schwarzkopf

[11] 3,757,385
[45] Sept. 11, 1973

[54] CARRIER BAG HANDLES OF THERMOPLASTIC MATERIAL PREFERABLY MADE BY AN INJECTION MOULDING PROCESS

[75] Inventor: August Schwarzkopf, Lengerich, Westphalia, Germany

[73] Assignee: Windmoller & Holscher, Lengerich of Westphalia, Germany

[22] Filed: May 18, 1971

[21] Appl. No.: 144,487

[30] Foreign Application Priority Data
May 27, 1970 Germany................. P 20 25 888.2

[52] U.S. Cl. .................................................. 16/110
[51] Int. Cl. ........................................... A47b 95/02
[58] Field of Search .............. 150/12; 16/110, 125; 229/54 R

[56] References Cited
UNITED STATES PATENTS
3,363,827  1/1968  Renner et al. .................... 229/54
3,313,470  4/1967  Renner et al. .................... 229/54

Primary Examiner—James T. McCall
Assistant Examiner—Doris L. Troutman
Attorney—Fleit, Gipple & Jacobson

[57] ABSTRACT

An injection-moulded carrier bag handle comprises a bar for securing to a carrier bag and an integral bowed hand grip defining a hand hole. The margin of the bar adjacent the hand grip is formed with a plurality of longitudinally aligned channels of U section which have their ends separated by transverse webs and their open mouths facing in alternately opposite directions towards the sides of the bar.

4 Claims, 4 Drawing Figures

INVENTOR
August SCHWARZKOPF

By
Fleit, Gipple & Jacobson
his ATTORNEYS

INVENTOR
August SCHWARZKOPF

By
Fleit, Gipple & Jacobson
his ATTORNEYS

CARRIER BAG HANDLES OF THERMOPLASTIC MATERIAL PREFERABLY MADE BY AN INJECTION MOULDING PROCESS

The invention relates to carrier bag handles of thermoplastic material preferably made by an injection moulding process.

The invention aims to provide such a handle comprising a bar for attachment to a carrier bag such as by welding and an integral bowed hand grip which defines a hand hole. In order that a carrier bag fitted with such a handle may be conveniently carried when full, the hand grip should be sufficiently thick to prevent it from digging into the hand. It is therefore usual to make the entire handle quite thick. However, a thick handle not only involves the use of more material but also needs to be cooled for longer periods in the injection mould thereby making it more expensive than a thin handle. Also, thick cross-sections have a tendency to be more susceptible to shrinkage during the injection moulding process.

The invention aims to provide a handle in which the hand grip is sufficiently wide for convenient carrying but the handle as a whole does not require the use of too much material but can nevertheless be made efficiently by a mass production technique.

According to the invention, a thermoplastic handle for a carrier bag comprises a bar for attachment to the top of the bag and an integral hand grip by which the bag can be carried when the handle is attached thereto, wherein the bar comprises a longitudinal reinforcing portion along a margin nearest the hand grip and a longitudinal bag-attachment portion along an opposite margin, the reinforcing portion being formed over substantially its entire length with longitudinal channels of substantially U section that are separated from one another by transverse webs and the open mouths of which face in alternately opposite directions towards the sides of the bar.

By means of the invention, therefore, thin-walled handles can be made which are nevertheless convenient to carry and sufficiently stiff and strong. Also, since the open mouths of the channels face in alternately opposite directions, both sides of the handle will have much the same appearance and it will not matter which side of the handle faces in which direction when it is attached to a bag.

Yet another advantage of having alternately directed channels is that the lowermost of a plurality of such handles stacked in a magazine can be readily pushed out from under the stack without the danger of catching on a superposed handle or becoming internested therewith, the sliding action during ejection from the magazine being facilitated by the alternately oppositely directed bases of the channels. Still further, the webs between the ends of the channels tend to stiffen the handle.

A carrier bag incorporating a single one-piece handle according to the invention preferably has the upper edge of one side of the bag secured to the attachment portion of the bar whilst the other side of the bag is extended beyond the said one side to define a flap which can be folded over the bar, a slot being provided in the flap for passing the hand grip therethrough.

The hand grip is preferably likewise formed with channels which are separated by transverse webs and have their open mouths facing in alternately opposite directions towards the sides of the hand grip. Handles with such hand grips are simple to make in a two-part injection mould. Alternatively, the hand grip may be of substantially U section with its open side directed upwardly, i.e. towards an edge of the hand grip remote from the bar. Although this construction calls for an injection mould provided with slides, the resultant handle may be easier to hold because it will have a closed and even base and sides and the appearance of the handle may be preferable.

Two examples of the invention are illustrated in the accompanying diagrammatic drawings, wherein.

The handle of both embodiments is moulded in one piece from thermoplastic material and comprises a bar 1 with an integral bowed hand grip 2 defining a hand hole. The bar 1 comprises a longitudinal reinforcing portion 4 along the margin nearest the hand grip 2 and a longitudinal bag attachment portion 3 along an opposite margin for welding to a plastics bag.

Figure 1:
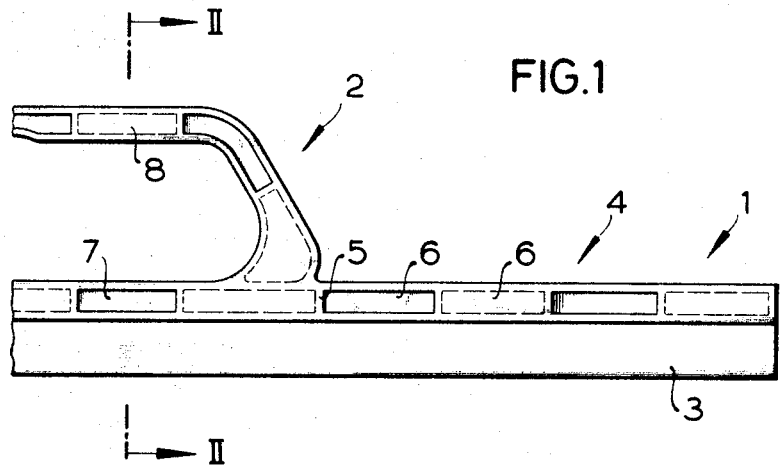
FIG. 1 is a fragmentary side elevation of a handle.
Figure 2:
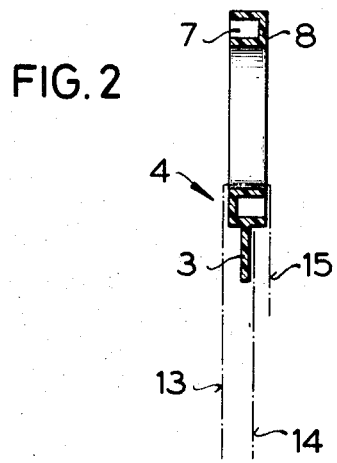
FIG. 2 is a section on the line II—II in FIG. 1.

In the FIGS. 1 and 2 construction, both the hand grip 2 and reinforcing portion 4 of the bar are formed with channels 6 of substantially U section separated from one another at the ends by transverse webs 5. The open mouths 7 and closed bases 8 of the channels face in alternately opposite directions towards the sides of the handle.

Figure 3:
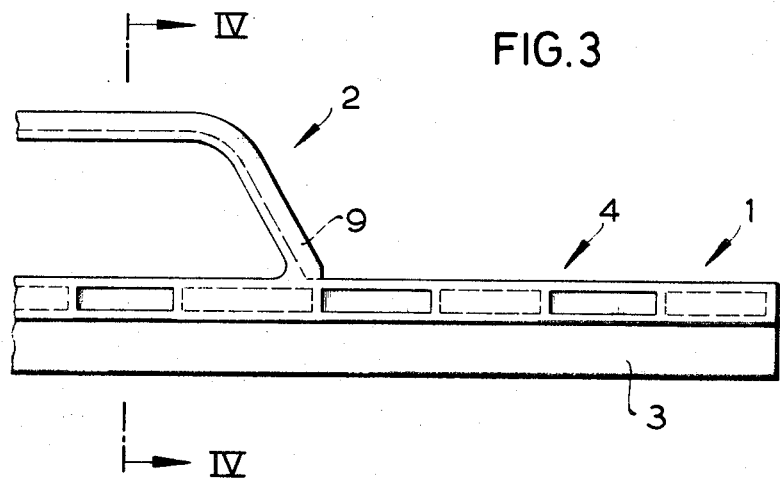
FIG. 3 is a fragmentary side elevation of a second embodiment of handle.
Figure 4:
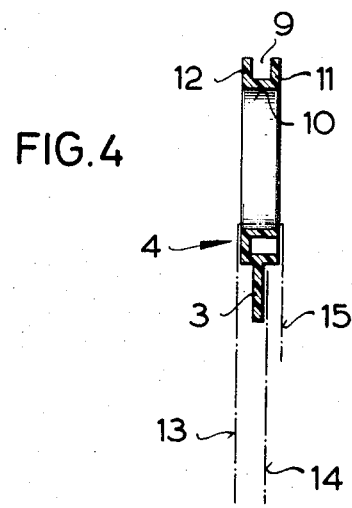
FIG. 4 is a section on the line IV—IV in FIG. 3.

In the embodiment of FIGS. 3 and 4 the hand grip 2 is provided with an upwardly open U-shaped channel 9 so that the smooth base 10 and sides 11 and 12 of the hand grip can be conveniently held in the hand which is passed through the hand hole.

As indicated in chain-dotted lines in FIGS. 2 and 4, the side 14 of a plastics bag is welded to the attachment portion 3 of the bar whilst the other side 13 of the bag carries an extension 15 in the form of a flap which is folded over the bar. The hand grip 2 is passed through a slot in the flap 15.

I claim:

1. A thermoplastic handle for a carrier bag comprising a bar for attachment to the top of the bag and an integral hand grip by which the bag can be carried when the handle is attached thereto, wherein the bar comprises a longitudinal reinforcing portion along a margin nearest the hand grip and a longitudinal bag-attachment portion along an opposite margin, the reinforcing portion being formed over substantially its entire length with longitudinal channels of substantially U section but are separated from one another by transverse webs and the open mouths of which face in alternately opposite directions towards the sides of the bar.

2. A handle according to claim 1, wherein the integral hand grip is likewise formed with channels which are separated by transverse webs and have their open mouths facing in alternately opposite directions towards the sides of the hand grip.

3. A handle according to claim 1, wherein the hand grip is of substantially U section and has its open sides directed towards an edge away from the bar.

4. A thermoplastic handle according to claim 1 in combination with a carrier bag wherein one side of the bag has its upper edge secured to said attachment portion and the other side of the bag has an upper edge which extends above the upper edge of said one side to define a flap adapted to be folded over said bar, and wherein said flap includes a slot for passing said hand grip therethrough.

* * * * *